United States Patent Office 3,371,220
Patented Feb. 27, 1968

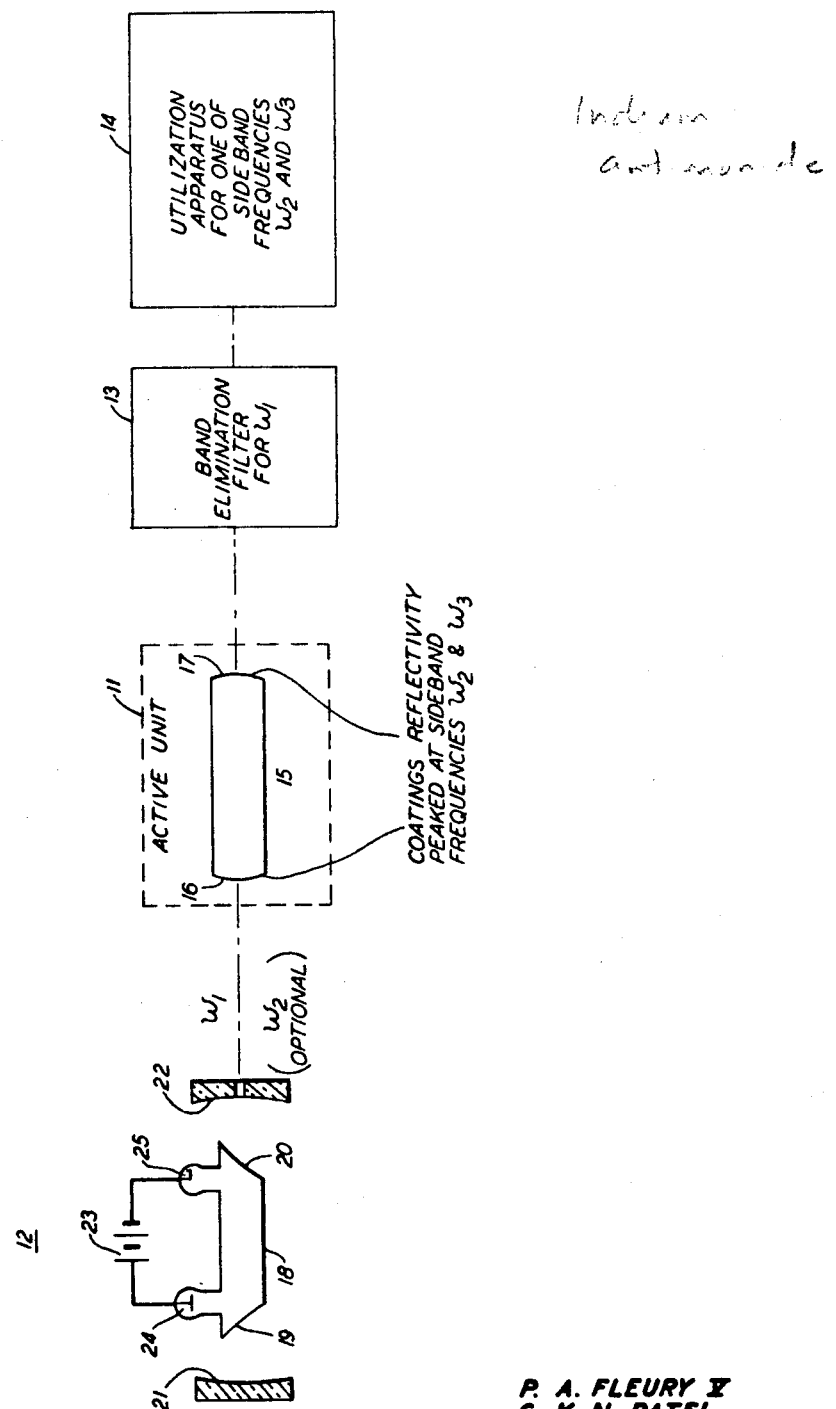

3,371,220
OPTICAL PARAMETRIC DEVICE USING THIRD-ORDER NONLINEARITY
Paul A. Fleury V, Plainfield, Chandra K. N. Patel, Chatham, Richart E. Slusher, Millington, and Peter A. Wolff, Berkeley Heights, N.J., assignors to Bell Telephone Laboratories, Incorporated, Berkeley Heights, N.J., a corporation of New York
Filed Oct. 25, 1966, Ser. No. 589,452
5 Claims. (Cl. 307—88.3)

ABSTRACT OF THE DISCLOSURE

Optical parametric devices, such as oscillators and mixers, can employ a third-order nonlinear interaction derived from the nonparabolicity of the conduction band in a suitable crystal having a nonparabolic conduction band. The strength of the effect is directly related to the concentration of mobile charge carriers. In one process employing the nonlinear interaction, the frequencies generated are the sideband frequencies, the sum of which is equal to twice the pumping frequency. Illustratively, a carbon dioxide laser operating at 10.6 microns is employed to pump an active unit including a crystal of n-type indium antimonide having an effective charge carrier concentration of $1 \times 10^{17}$ carriers per cubic centimeter, which concentration provides a substantial plasma suitable for the nonlinear interaction.

---

This invention relates to optical parametric and mixing devices.

Heretofore, optical parametric devices for use as oscillators, amplifiers, or harmonic generators have employed crystals that exhibit birefringence or are optically anisotropic. This quality of birefringence has heretofore been necessary in order that phase-matching among the pump, signal, and idler waves can be achieved. Further, in the typical parametric interaction the pump frequency is greater than that of either the signal or idler wave and equal to the sum of the two. Other types of mixing interactions where parametric amplification can take place are usually not feasible.

In addition, the phase-matched parametric interaction is rather weak in most suitable optical materials.

The present invention is directed to the alleviation of these problems.

Our invention is based on the discovery of surprisingly strong and efficient generation, in a suitable crystal having a nonparabolic conduction band, of sum and difference frequencies, typically the difference frequency $\omega_3 = 2\omega_1 - \omega_2$, where $\omega_1$ is the pump frequency and $\omega_2$ is a parametric sideband frequency that is favored for propagation in the device by either the simultaneous application of an input beam at frequency $\omega_2$ or a resonator having resonance peaked near $\omega_2$. If the relative input powers at $\omega_2$ and $\omega_1$ are nearly equal, or are interchanged, another difference frequence, or sideband frequency, $\omega_4 = 2\omega_2 - \omega_1$ is also generated with strength comparable to $\omega_3$. For this interaction, $\omega_1$ becomes a sideband frequency. The term "sideband frequency" is used herein in the sense of a frequency, e.g. $\omega_3$, that typically coexists with another frequency, e.g., $\omega_2$, the two frequencies deviating by equal amounts from a pumping or carrier frequency, e.g., $\omega_1$. Nevertheless, the effect is not limited to generation of sideband frequencies and includes the generation of such sum frequencies as $\omega = 3\omega_1$.

In every case, the process is a four-quantum process, involving two or three input quanta producing two or one output quanta, respectively.

Our invention is further based upon the realization that the strength of these effects is much greater than can be accounted for by most nonlinear interactions that could occur in such crystals and apparently is attributable both to the nonparabolicity of the conduction band of the crystal and to appropriate promotion of a four-quantum process. Therefore, our invention extends to the employment of any crystal having a nonparabolic conduction band in a mixing device in which a four-quantum process is promoted, for example, by favoring one of the sideband frequencies.

A further distinct advantage of the present invention, attributable to the aforesaid difference-frequency relationships, is that the relatively close spacing of the three frequencies involved in the four-quantum process yields very long coherence lengths and makes phase-matching very easy, indeed, nearly automatic. Thus, the active medium need not have birefringence.

Even though the difference-frequency interactions require no special techniques for phase-matching, they are nonetheless very broad band interactions and are comparable in this respect to known parametric interactions. Thus, the frequencies of the incident radiation or radiations can be varied over relatively wide ranges. However, the strength of the generated radiation will remain substantially constant in those cases that involve the favoring of a sideband frequency only if an appropriate sideband frequency is favored for every variation in pumping frequency.

Further features and advantages of the present invention will become apparent from the following detailed description, taken together with the drawing, in which the sole figure is a partially pictorial and partially block diagrammatic showing of a preferred embodiment of the invention.

In the drawing, the parametric device comprises an active unit 11, a carbon dioxide laser 12 employed to pump the active unit 11, and a band elimination filter 13 for the pump frequency $\omega_1$ interposed between the active unit 11 and the utilization apparatus 14.

The active unit 11 includes the single crystal 15 of n-type indium antimonide (InSb) having reflective end coatings 16 and 17 peaked at both of the sideband frequencies $\omega_2$ and $\omega_3$, illustratively 9.6 microns and 11.8 microns, the coatings illustratively being placed on focusing spherically curved surfaces of crystal 15. The indium antimonide typically has an effective charge carrier concentration of $1 \times 10^{17}$ carriers per cubic centimeter. The orientation of the crystalline axes of the isotropic crystal 15 has been found not to be critical.

The carbon dioxide laser 12 includes a tube 18 having Brewster-angle end faces 19 and 20 and reflectors 21 and 22, which illustratively form a near-confocal resonator. The tube 18 typically contains a mixture of carbon dioxide, nitrogen, and helium and is powered by a direct-current discharge from the direct-current source 23 through the anode 24 and the cathode 25. Preferred arrangements for the laser 12 are found in the copending patent application of C. K. N. Patel, Ser. No. 495,844, filed Oct. 14, 1965, and assigned to the assignee hereof. The reflectors 21 and 22 and the gas pressure are adapted so that the laser produces coherent radiation with substantial power at 9.6 microns as well as at 10.6 microns. Specifically, the carbon dioxide laser can be made to produce a substantial amount of 9.6 micron radiation by reducing the helium pressure below the optimum value for normal operation. Decreasing the transmission of the output coupling mirror will tend to increase the proportion of 9.6 micron radiation relative to the 10.6 micron radiation. It should be understood, however, that this adaptation is optional; and it is sufficient for the laser 12 to generate only one wavelength of coherent radiation provided some other means is associated with the active unit 11 for favoring the propagation of both of the desired sideband frequencies, illustratively $\omega_2$ and $\omega_3$, where $$\omega_3 = 2\omega_1 - \omega_2 \quad (1)$$

Such other means are illustratively the coatings 16 and 17. Preferably, the coatings have a relatively high transmission (low reflectivity) at the pumping frequency. Such a double-peaked reflectivity characteristic is within the present state of the art.

The band elimination filter 13 is illustratively a 0.040 inch-thick germanium substrate interference filter.

The utilization apparatus 14 is illustratively an apparatus which responds more readily to one of the sideband frequencies than to the pump frequency $\omega_1$. The apparatus 14 may be a modulator for modulating 11.8 micron or 8.7 micron radiation or a detector for detecting modulated 11.8 micron or 8.7 micron radiation. Both of these wavelengths are provided by the active unit 11 in the illustrative embodiment. For example, when the wavelength for the sideband frequency $\omega_2$ is the 9.6 microns mentioned above, $\omega_1$ corresponding to a wavelength of 10.6 microns, the wavelength for the sideband frequency $\omega_3$ is 11.8 microns. The sideband frequency, $\omega_4 = 2\omega_2 - \omega_1$, where $\omega_4$ corresponds to a wavelength of 8.7 microns, is also obtained in this apparatus in an amount dependent on the amount of available 9.6 micron radiation. It is understood that it is generally useful to be able to shift the frequency of a coherent optical radiation, whether it is modulated or not. The above-described embodiment is useful as a resonant mixer or regenerative parametric amplifier, or, with a sufficiently high Q at the sideband frequencies, as a parametric oscillator.

The crystal 15 may be composed of any material having a nonparabolic conduction band and having a significant concentration of mobile charge carriers of relatively small effective mass. The charge carrier effective mass is considered to be relatively small if it is substantially smaller, e.g., an order of magnitude smaller, than the rest mass of an electron. Examples of materials meeting the foregoing requirements are indium antimonide (InSb), indium arsenide (InAs), mixtures of the foregoing, lead telluride (PbTe), or bismuth (Bi), or the following materials that are subjected to uniaxial stress: p-type silicon (Si), p-type germanium (Ge), p-type indium antimonide (InSb), InAs or other material having a degenerate valence band. In the cases of the unstressed materials, it is generally desirable that the materials be n-type since the electron charge carriers will generally have a lower effective mass than the holes. In the case of the squeezed materials, it is generally desirable that the material be p-type since the nonparabolic bands employed are the heavy hole and light hole bands which have been separated by the pressure to make a small gap. It should be understood that, in the case of the unstressed materials, p-type material could also be used if provided with holes with sufficiently low effective mass. In all cases, the strength of the nonlinear effect employed in this invention increases with the charge carrier concentration. In general, the charge carrier concentration can vary between about $5 \times 10^{14}$ and $5 \times 10^{20}$ carries per cubic centimeter.

A variety of other semiconductive materials in addition to those described above could also be employed. In selecting such materials it should be borne in mind that the nonparabolic bands of the sort useful for the present invention are usually associated with very small gaps, or separations, between two bands.

In operation, the conduction electrons in the crystal 15 give rise to a nonlinear interaction between the 10.6 micron beam from the carbon dioxide laser 12 and a 9.6 micron radiation, part of which comes from the laser 12 and part of which is generated in the crystal 15 because of the peaked reflectivity of the reflectors 16 and 17. In this respect the furnishing of 9.6 micron radiation from the later 12 is optional. The typical nonlinear interaction is one in which two 10.6 micron photons (each of frequency $\omega_1$) combine to produce a photon at 9.6 micron (frequency $\omega_2$) and a second photon at the difference frequency, $\omega_3 = 2\omega_1 - \omega_2$, which corresponds to a wave length of 11.8 microns. Energy is conserved in this interaction, so that no excitation, other than slight heating that is not caused by the photons involved in the mixing, remains in the indium antimonide crystal 15 which causes the mixing. In an experimental version of this device employing powerful beams at both 10.6 microns and 9.6 microns but without reflective coatings 16 and 17 on the crystal 15, the interaction produced surprisingly strong output radiation at 11.8 microns in the forward direction. In other experiments, powerful 9.6 micron beams, together with beams at 10.6 microns, produced an appreciable output at 8.7 microns, as mentioned above. In still other experiments, a powerful beam at 10.6 microns produced appreciable amounts of the sum frequency $\omega_3 = 3\omega_1$, where $\omega_3$ corresponds to a wavelength of 3.53 microns. The first two sets of experiments demonstrate the utility of the device as a non-resonant mixer.

Without wishing to be bound by the following tentative theory as an explanation for our invention, we suggest that the nonlinear interaction makes use of the nonparabolic nature of the conduction band in indium antimonide, a characteristic which is known to be relatively large in n-type indium antimonide.

It has been previously suggested that, where a parabolic energy-momentum relationship describes the state of electrons in a plasma, that a very weak generation of sidebands can be obtained as a result of electron density fluctuations driven by incident light fields. Nevertheless, such an effect cannot produce the surprisingly strong generation obtained in experimental embodiments of our invention. In addition, third-order nonlinear effects of bound electrons are generally too weak to explain the observed results.

In contrast, we now consider the nonlinear behavior of a plasma of carriers in a nonparabolic conduction band, as follows. By nonparabolic conduction band, we mean that the electron's velocity is a nonlinear function of its momentum. An intuitive appreciation of this function may be gained by considering that a mobile carrier being accelerated by an optical electric field experiences an increase in its effective mass. This possibility exists because the effective mass of the mobile, or conduction, carrier in such a material is in all cases much less than the mass of an entirely free carrier. For example, in InSb the energy-momentum relation for electrons is approximately $$H \cong \sqrt{\frac{E_G^2}{2} + \frac{p^2}{2m^*}E_G} \quad (2)$$

where $E_G$ is the band gap, H is the carrier energy, p is the carrier momentum, and $m^*$ is the effective mass of the carrier, all in consistent units.

With the preceding equation as a starting point, we can derive a nonlinear susceptibility, $\chi^{(3)}$ $$\chi^{(3)} = \left[\frac{n_0 e^4}{4(m^*)^2 E_G \omega_1^2 \omega_2 \omega_3}\right]\left[\frac{1+\frac{8E_F}{5E_G}}{\left(1+\frac{4E_F}{E_G}\right)^{5/2}}\right] \quad (3)$$

where $n_0$ is the initial conduction electron density, e is the charge of an electron, $\omega_1$ is the frequency of the pumping radiation for the particular interaction, $\omega_2$ and $\omega_3$ are the other frequencies involved, one of which could be equal to $\omega_1$, and $E_F$ is the Fermi energy calculated with the band edge mass.

It can be shown that the power transfer as a result of this nonlinear suspectibility is, for a particular frequency, $\omega_3$:

$$P_{\omega_3} = \frac{256\pi^4(\omega_3)^2}{(n_{\omega_1})^2 n_{\omega_2} n_{\omega_3} c^4}(3\chi^{(3)})^2 l^2 \frac{P_{\omega_1}^2 P_{\omega_2}}{(a^2)^2} \quad (4)$$

where c=velocity of light, l=crystal length, if less than the coherence length, $n_{\omega_1}$, $n_{\omega_2}$ and $n_{\omega_3}$ are the indices of refraction associated with the respective designated frequencies, and $a^2$ is the cross-sectional area of the incident beams.

Although the interaction we describe is unusual in its dependence upon a plasma charge carrier in a nonparabolic conduction band, the interaction has several desirable qualities in common with previously observed four-quantum nonlinear interactions. First, as pointed out by J. A. Giordmaine in his copending patent application, Ser. No. 513,704, filed Dec. 14, 1965, and assigned to the assignee hereof, in a four-quantum process phase-matching in a material of moderate dispersion is fairly easy because of the relatively close spacing of the frequencies of the interacting waves. In addition, exactly phase-matched operation could be obtained by electric-field-induced birefringence or pressure-induced birefringence, since the amount of birefringence required for exact phase-matching is very small. Phase-matching can also probably be achieved with a DC magnetic field. This version would provide a very convenient technique for tuning a parametric oscillator. Moreover, a simple resonator structure can be employed inasmuch as only one common direction for resonating is needed.

The measured powers at 11.8 microns and 8.7 microns in our experiments were found to be as much as $10^3$ times larger than those estimated from bound electron nonlinearities, such as that proposed by Giordmaine.

Various modifications of the embodiment of the drawing are possible.

A non-resonant mixer such as used in our experiments, with the modification that one of the input beams is modulated, is a very useful mixing device such as would be used in superheterodyne transmission of information. Further, with two input beams, one of which is modulated, the device is useful as a parametric amplifier.

Also, only one frequency of input radiation need be employed, provided sufficiently good reflective coatings 16 and 17 are provided and are peaked at both of the desired sideband frequencies, which should be frequencies sufficiently close to the pump frequency to promote the four-quantum process strongly. In this case, the device becomes a parametric oscillator that generates both of the sideband frequencies within the crystal 15. The closer the sideband frequencies are to the pump frequency, the easier it becomes to exceed the oscillation threshold.

In cases where the presence of the pumping frequency $\omega_1$ in the output is not objectionable, the band elimination filter 13 can be eliminated.

As mentioned above, in cases in which a tunable mixing process or tunable parametric oscillator is desired, it is desirable to keep the frequencies relatively closely spaced, so that the pumping and sideband frequencies should be varied together. Nevertheless, it is also possible to deviate from this practice with a somewhat greater power loss through phase mismatch. Thus, given a set of coatings 16 and 17 with peaked reflectivity at frequencies $\omega_2$ and $\omega_3$, if the pumping frequency $\omega_1$ is varied substantially, the frequency $\omega_3$ of the other sideband will vary twice as rapidly in order to satisfy the frequency relationship characteristics of a four-quantum process, as set out above.

Various other modifications of the above-described embodiments can be made by those skilled in the art according to the principles of the present invention without departing from the spirit and scope of the invention.

What is claimed is:

1. An optical parametric device comprising a crystal of a material having a nonparabolic conduction band and having a concentration of mobile charge carriers in said conduction band sufficient to produce in response to pumping energy a third-order nonlinear interaction that predominates over nonlinear effects of bound electrons, means for supplying pumping energy at a frequency $\omega_1$ in said crystal, means for promoting said third-order nonlinear interaction to produce a four-quantum nonlinear process involving at least two quanta of said pumping energy, at least one of the other of said quanta being generated in said third-order linear interaction, and means for utilizing output radiation from said crystal at the frequency of a generated quantum.

2. An optical parametric device as claimed in claim 1 in which the material of the crystal is selected from the group consisting of indium antimonide, indium arsenide, mixtures of the foregoing, lead telluride, bismuth, silicon, and germanium, said material having a concentration of mobile charge carriers between about $5 \times 10^{14}$ and $5 \times 10^{20}$ carriers per cubic centimeter.

3. An optical parametric device as claimed in claim 1 in which the means for promoting a third-order nonlinear interaction comprises means for favoring the propagation of a sideband frequency, including a source of coherent radiation at said sideband frequency disposed to direct said radiation into said crystal collinearly with said pumping radiation.

4. An optical parametric device as claimed in claim 1 in which the means for promoting a third-order nonlinear interaction comprises means for favoring propagation of sideband frequencies, including an optical resonator disposed about said crystal and having a reflectivity peaked at said sideband frequencies.

5. An optical parametric device as claimed in claim 1 in which the material of the crystal is n-type indium antimonide having a mobile charge carrier concentration between $5 \times 10^{14}$ and $5 \times 10^{20}$ charge carriers per cubic centimeter in the nonparabolic conduction band, and in which the means for supplying pumping radiation comprises a carbon dioxide laser adapted to generate a beam of coherent radiation at a first frequency, the means for promoting said third-order nonlinear interaction comprises means for favoring the propagation of a second frequency in the crystal, including an adaptation of said laser simultaneously to generate a coherent beam of radiation at said second frequency, said beams being propagated substantially collinearly through said crystal.

References Cited

UNITED STATES PATENTS 3,309,526   3/1967   Giordmaine _____ 330—4.5

OTHER REFERENCES

"Quantum Electronics, Paris, 1963 Conference," edited by Grivet, et al., Columbia 1964 pp. 1521–1526 (article by Lax, et al.).

ROY LAKE, *Primary Examiner.*

D. HOSTETTER, *Examiner.*